(12) United States Patent
Moon (10) Patent No.: US 7,096,334 B2
(45) Date of Patent: Aug. 22, 2006

(54) DEVICE TO SELECTIVELY PROTECT A REPRODUCTION OF A DISK, METHOD OF SELECTIVELY PROTECTING REPRODUCTION OF THE DISK, AND RECORDING MEDIUM FOR THE METHOD

(75) Inventor: Yong-sic Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 10/372,958

(22) Filed: Feb. 26, 2003

(65) Prior Publication Data

US 2004/0049647 A1 Mar. 11, 2004

(30) Foreign Application Priority Data

Sep. 10, 2002 (KR) ................. 2002-54517

(51) Int. Cl.
*G06F 12/14* (2006.01)
(52) U.S. Cl. .................... 711/164; 713/193
(58) Field of Classification Search ............. 711/164; 713/208
See application file for complete search history.

(56) References Cited

U.S. PATENT DOCUMENTS 6,993,135 B1 * 1/2006 Ishibashi .................. 380/277
2001/0021255 A1 * 9/2001 Ishibashi .................. 380/277
2001/0037459 A1 * 11/2001 Ogawa et al. ............. 713/200
2002/0044657 A1 * 4/2002 Asano et al. .............. 380/201
2002/0085722 A1 * 7/2002 Asano et al. .............. 380/278
2002/0152387 A1 * 10/2002 Asano ...................... 713/176
2002/0159594 A1 * 10/2002 Kori ......................... 380/203
2003/0051151 A1 * 3/2003 Asano et al. .............. 713/193
2003/0152368 A1 * 8/2003 Kitani ....................... 386/94

FOREIGN PATENT DOCUMENTS

JP     08-235758     9/1996
JP     2001-268510     9/2001

OTHER PUBLICATIONS

Office Action dated Jan. 25, 2005 issued in corresponding Korean Patent Application No. 10-2002-0054517.

* cited by examiner

*Primary Examiner*—Kevin Verbrugge
(74) *Attorney, Agent, or Firm*—Staas & Halsey LLP (57) ABSTRACT

A device to protect a reproduction of a disk, a method of protecting the reproduction of the disk, and a recording medium for the method. The device includes a key setting unit to generate a key to encode lead-in region information of the disk desired to be reproduced and a key storing unit to store the key. A key storing unit in the device stores the key generated by the key setting unit, and a reproduction determining unit determines whether to reproduce the disk using the key.

19 Claims, 7 Drawing Sheets

DEVICE TO SELECTIVELY PROTECT A REPRODUCTION OF A DISK, METHOD OF SELECTIVELY PROTECTING REPRODUCTION OF THE DISK, AND RECORDING MEDIUM FOR THE METHOD

CROSS-REFERENCE TO RELATED APPLICATIONS

This application claims the benefit of Korean Application No. 2002-54517, filed Sep. 10, 2002, in the Korean Intellectual Property Office, the disclosure of which is incorporated herein by reference.

BACKGROUND OF THE INVENTION

1. Field of the Invention

The present invention relates to a device to protect a reproduction of a disk, a method of protecting the reproduction of the disk, and a recording medium for the method and more particularly, to a device to protect a reproduction of a disk using a lead-in region of the disk, a method of protecting reproduction of the disk, and a recording medium for the method.

2. Description of the Related Art

"Parental control," which has been mentioned regarding conventional DVD systems, makes it possible to automatically reproduce only images and sounds that are determined as appropriate to provide to viewers. Parental control is achieved by comparing a parental level of a disk with an upper limit of the parental level of a disk player. The parental control can be set up on every title or part of a title, i.e., on some scenes which are considered inappropriate or controversial. In this case, only scenes in a certain parental control block, within the parental level that is allowable, are sequentially reproduced.

Figure 1:
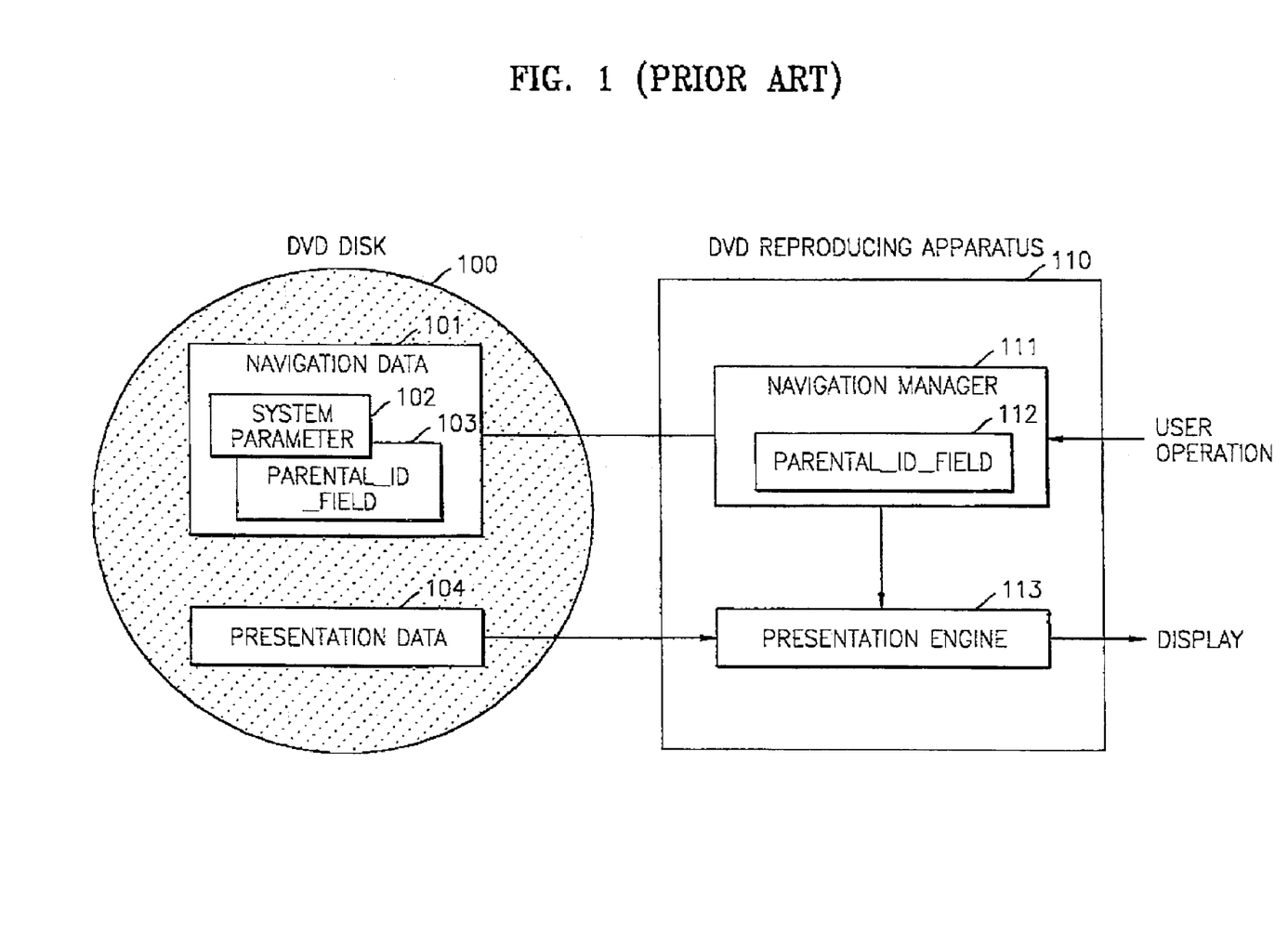
FIG. 1 is a diagram showing a conventional parental lock function of a DVD.

FIG. 1 is a diagram showing a conventional parental lock function of a DVD 100. The DVD 100 has presentation data 104, such as audio data or video data, and navigation data 101 which controls the presentation data 104. The navigation data 101 has Parental_ID_Field 103 as a system parameter 102. A DVD reproducing unit 110 includes a navigation manager 111, which manages the navigation data 101 of the DVD 100, and a presentation engine 113, which displays the presentation data 104 of the DVD 100. The parental control to reproduce the DVD 100 is performed comparing the Parental_ID_Field 103 stored in the DVD 100 with Player_Parental_ID 112 included in the DVD reproducing unit 110. In other words, the DVD reproducing unit 110 checks if the Player_Parental_ID 112 matches with the Parental_ID field 130 of a PGC for playback, and if the Player_Parental_ID 112 and the Parental_ID field 130 do not match with each other, or if no valid Parental ID is specified, the DVD reproducing unit 110 prevents a reproduction of the DVD 100.

Such a parental lock function can be performed in the DVD reproducing unit 110 only when the disk 100 supports the same function. However, in conventional readable optical recording media, a reproduction prevention lock can be set up on a DVD player so that recording media can possibly be prevented from being reproduced in the DVD player according to a user's preference, even though the recording media do not support a parental lock function.

SUMMARY OF THE INVENTION

The present invention provides a device to protect a reproduction of a disk, a method of protecting the reproduction of the disk, and a recording medium for the method, which are capable of setting up a reproduction prevention lock according to a user's preference.

Additional objects and/or advantages of the invention will be set forth in part in the description which follows and, in part, will be obvious from the description, or may be learned by practice of the invention.

According to an aspect of the present invention, there is provided a device to protect a reproduction of a disk. The device includes a key setting unit generating a key to encode lead-in region information of the disk and registering the key; a key storing unit storing the key generated by the key setting unit; and a reproduction determining unit determining whether to reproduce the disk using the key stored in the key storing unit.

According to an aspect of the present invention, the key setting unit includes a key generating unit generating the key to encode the lead-in region information of the disk; a key registering unit registering the key for the disk; and a password registering unit registering a password input from a user for the key.

According to an aspect of the present invention, the reproduction determining unit includes a temporary storing unit storing the key generated to encode the lead-in region information of the disk requested to be reproduced; a key searching unit searching a same key value in the key storing unit as the key that is stored in the temporary storing unit; and a password comparing unit comparing the password input from the user with the password for the key stored in the key storing unit, allowing the reproduction of the disk when the key in the key storing unit is the same key value as the key stored in the temporary storing unit, and preventing the reproduction of the disk otherwise.

According to another aspect of the present invention, there is provided a method of protecting a reproduction of a disk. The method includes registering a key and a key value of the disk by encoding lead-in region information of the disk; and determining reproduction of the disk requested to be reproduced using the registered key.

According to an aspect of the present invention, there is provided setting up another key of the disk, wherein the setting up of the key comprises: generating the other key encoding the lead-in region information of the disk, registering the other key generated for the disk and a corresponding key value, and registering a password from a user to correspond to the other registered key.

According to an aspect of the present invention, the determining reproduction of the disk includes determining whether the key value of the disk to be reproduced is equal to the key value of the other registered key; and receiving another password from the user when the key value of the disk to be reproduced is equal to the key value of the other registered key, allowing reproduction of the disk when the password of the key of the disk to be reproduced is the same as the other password from the user, and preventing the reproduction of the disk when the password for the key of the disk to be reproduced is not the same as the other password from the user.

According to still another aspect of the present invention, there is provided a computer-readable recording medium on which programs are recorded so as to provide the aforementioned method of protecting a reproduction of a disk.

According to an aspect of the present invention, there is provided a method of setting up a key on a disk, including: receiving a request from a user to set up a lock on the disk; reading data in a lead-in region of the disk; generating a key for the disk using the data read from the lead-in region of the disk; storing the key; and receiving and storing a password for the key stored.

According to an aspect of the present invention, there is provided a method of reproducing a disk, including: generating a key using data in a lead-in region of the disk to be reproduced; storing the key and a corresponding key value; searching for a reference key value; and reproducing the disk when the reference key value is equal to the key value generated for the disk.

According to an aspect of the present invention, there is provided a device to protect a reproduction of a disk, including: a key setting unit generating a key to encode lead-in region information of the disk and registering the key; a key storing unit storing the key generated by the key setting unit; and a reproduction determining unit registering a password input from a user for the key.

According to an aspect of the present invention, there is provided a device to protect a reproduction of a disk, the device having a key setting unit to generate a key to encode lead-in region information of the disk and to register the key, a key storing unit to store the key generated by the key setting unit, and a reproduction determining unit storing a password input from a user for the key, the device including: a password comparing unit receiving another password from the user, allowing reproduction of the disk when the password of the key of the disk to be reproduced is the same as the other password from the user, and preventing the reproduction of the disk when the password for the key of the disk to be reproduced is not the same as the other password from the user.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
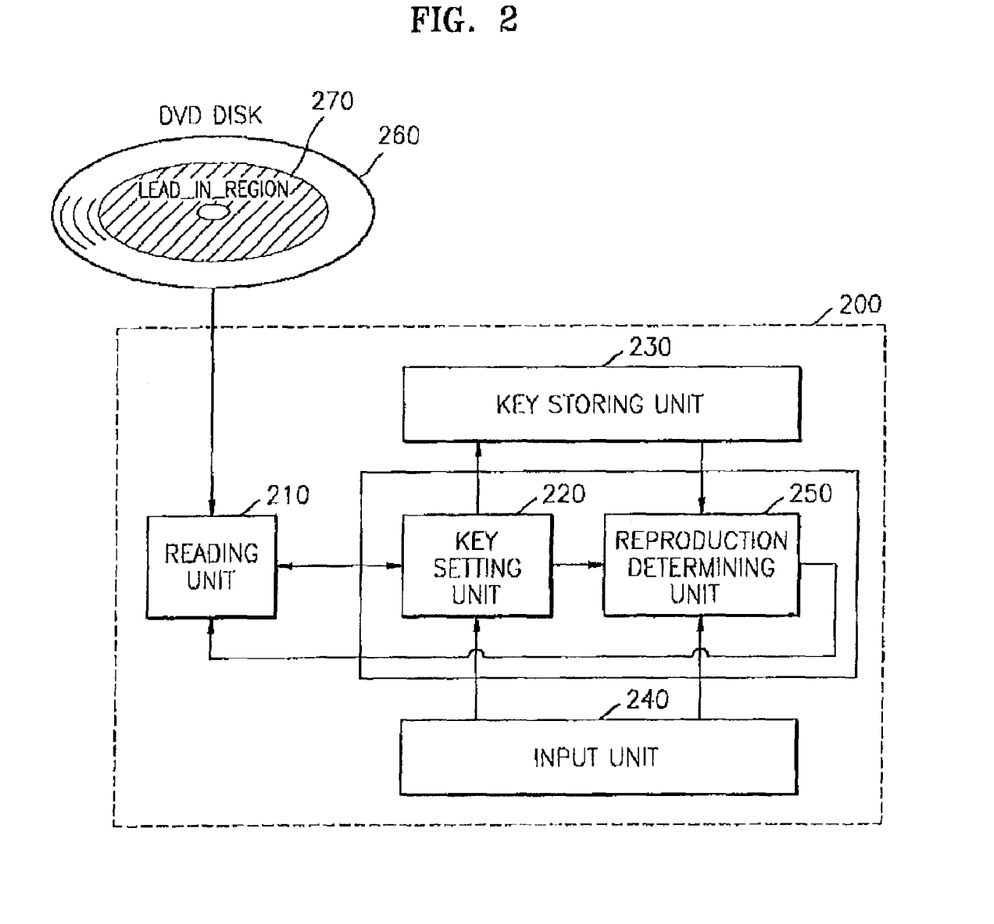
FIG. 2 is a diagram showing a structure of a device to protect a reproduction of a disk, according to an aspect of the present invention.

FIG. 2 shows a device 200 to protect a reproduction of a disk 260, according to an aspect of the present invention. The device 200 to protect the reproduction of the disk includes a reading unit 210, a key setting unit 220, a key storing unit 230, a user input unit 240, and a reproduction determining unit 250 to determine whether or not the disk 260 will be reproduced.

The reading unit 210 reads information of a lead-in region 270 of the disk 260 and sends the information to the key setting unit 220.

The key setting unit 220 generates a key to encode the information of the lead-in region 270 input from the reading unit 210 and registers the key in the key storing unit 230. Next, the key setting unit 220 receives a user input password from the input unit 240 and registers the user input password to correspond to the key which has been already registered. In general, the information of the lead-in region 270 is different depending on the disk 260, and thus, the key generated when encoding the lead-in region information may also be different depending on the disk 260.

The key storing unit 230 stores the key set up on the disk 260 and the user input password.

The reproduction determining unit 250 determines whether or not the disk 260 desired to be reproduced may be reproduced and allows or prevents the reproduction of the disk 260 according to a result of the determination.

Here, if a user wants to set up a lock on a new disk, the key setting unit 220 sets up a key for the new disk. If there is a request to reproduce the new disk, the reproduction determining unit 250 determines whether or not the new disk will be reproduced based on whether or not there is a lock set up on the new disk.

Figure 3:
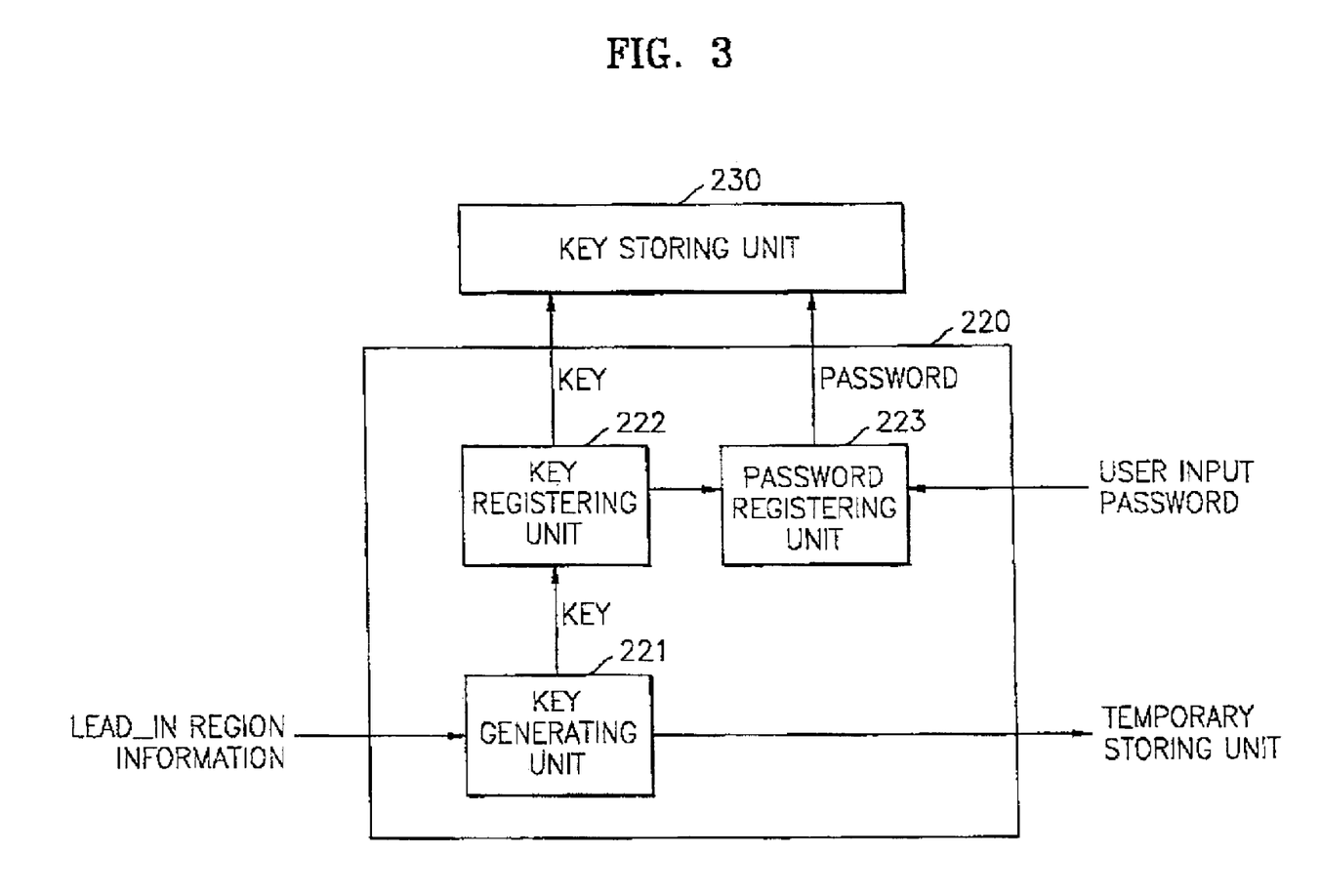
FIG. 3 is a diagram showing a structure of a key setting unit shown in FIG. 2.

FIG. 3 shows a structure of the key setting unit 220 shown in FIG. 2. Referring to FIG. 3, the key setting unit 220 includes a key generating unit 221, a key registering unit 222, and a password registering unit 223.

The key generating unit 221 receives the lead-in information obtained by the reading unit 210 and generates a key following a predetermined encoding method.

Figure 4:
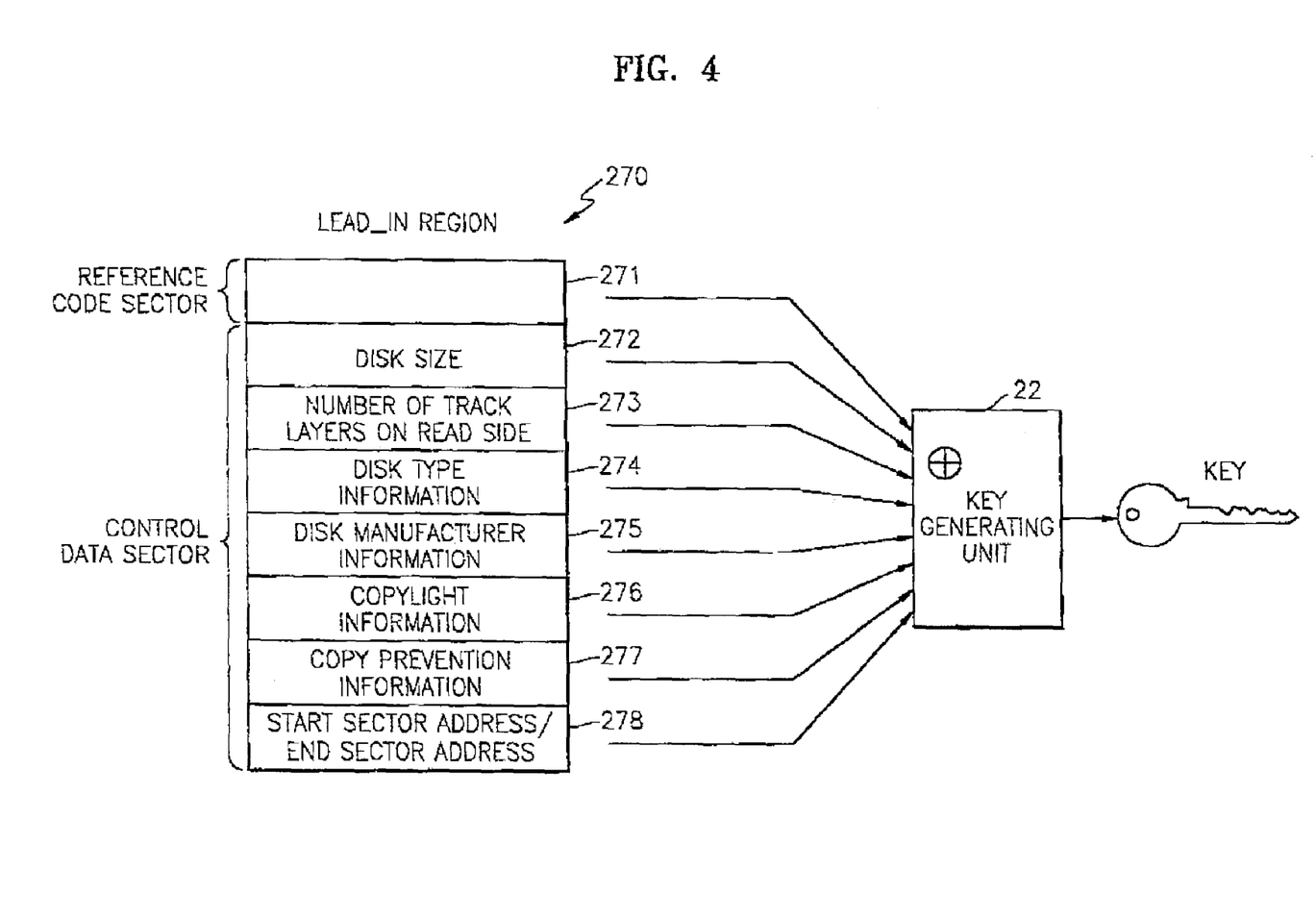
FIG. 4 is a diagram showing a method of generating a key, according to an aspect of the present invention.

The operation of the key generating unit 221 is shown in FIG. 4. The lead-in region 270 of the disk 260 includes a reference code sector 271, which represents a periodicity of pit patterns of modulated signals on tracks and a control data sector. The control data sector includes a disk size 272, a number of track layers on a readable side 273, disk type information 274, disk manufacturer information 275, copyright information 276, copy prevention information 277, and a start sector address/end sector address 278. The key generating unit 221 extracts and encodes at least one piece of information out of the information in the lead-in region 270 to generate the key. The information of the lead-in region 270 is different depending on the disk 260, and, thus, the key generated encoding the lead-in region information is also different depending on the disk 260. According to an aspect of the present invention, it is determined whether the disk 260 will be reproduced using a certain key generated exclusively for that disk 260. The key generated by the key generating unit 221 is transferred to the key registering unit 222, and the key registering unit 222 stores the received key in the key storing unit 230. After the key is stored in the key storing unit 230, the password registering unit 223 receives the password desired to be set up on the disk 260 by the user from the input unit 240 and stores the password to correspond to the key registered in the key storing unit 230.

Figure 5:
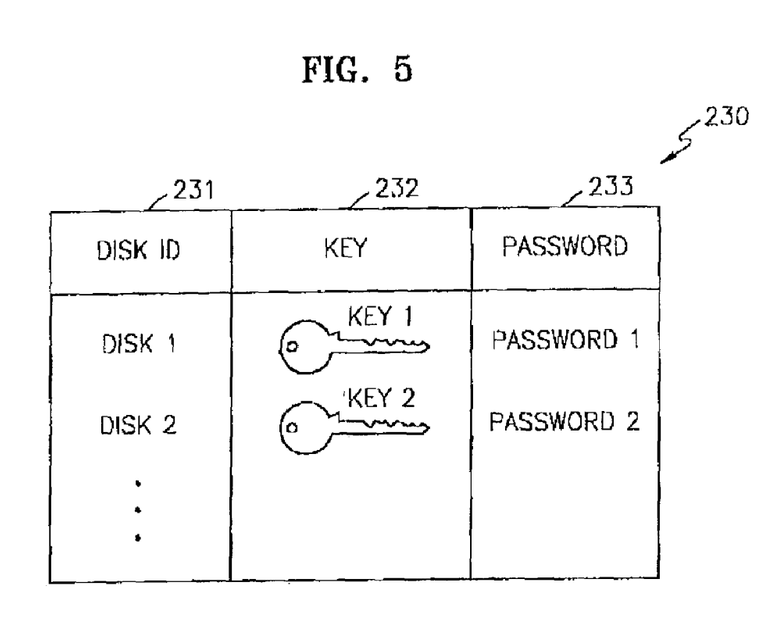
FIG. 5 is a diagram showing the structure of a key storing unit shown in FIG. 2.

As shown in FIG. 5, in the key storing unit 230, there are three fields 231, 232, and 233 for registering a disk ID, the key, and the password, respectively, for the disk 260.

Figure 6:
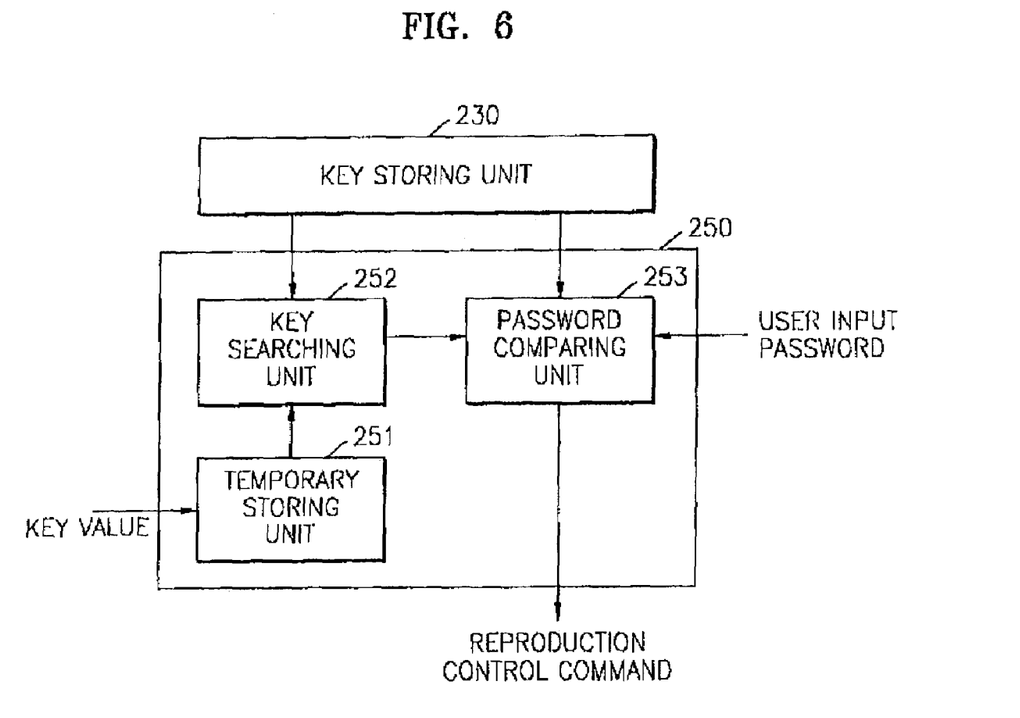
FIG. 6 is a diagram showing the structure of a unit to determine whether the disk is to be reproduced.

Referring to FIG. 6, the reproduction determining unit 250 includes a temporary storing unit 251, a key searching unit 252, and a password comparing unit 253.

If there is a user's request to reproduce the disk 260, the information in the lead-in region 270 of the disk 260 is read, and the key is generated using the key generating unit 221. Next, the key generated for the disk 260 to be reproduced, is transmitted to the temporary storing unit 251.

The key searching unit 252 searches for the same key value in the key storing unit 230 as the key for the disk 260, which is stored in the temporary storing unit 251. If the same key value as the one that is stored in the temporary storing unit 251 does not exist in the storing unit 230, it is considered that a reproduction prevention lock has not been set up on the disk 260, and, thus, a reproduction command is immediately sent to the reading unit 210. On the other hand, if the same key value as the key that is stored in the temporary storing unit 251 exists in the storing unit 230, a reproduction prevention lock is considered having been set up on the disk 260. The password comparing unit 253 then receives a password from the user and compares the password with the password that is stored in the key storing unit 230 corresponding to the key value stored in the key storing unit 230. As a result of the comparison, if the key newly input from the user is the same as the key stored in the key storing unit 230, a control command to allow the reproduction of the disk 260 is sent to the reading unit 210; otherwise, the reproduction of the disk 260 is prevented.

Figure 7:
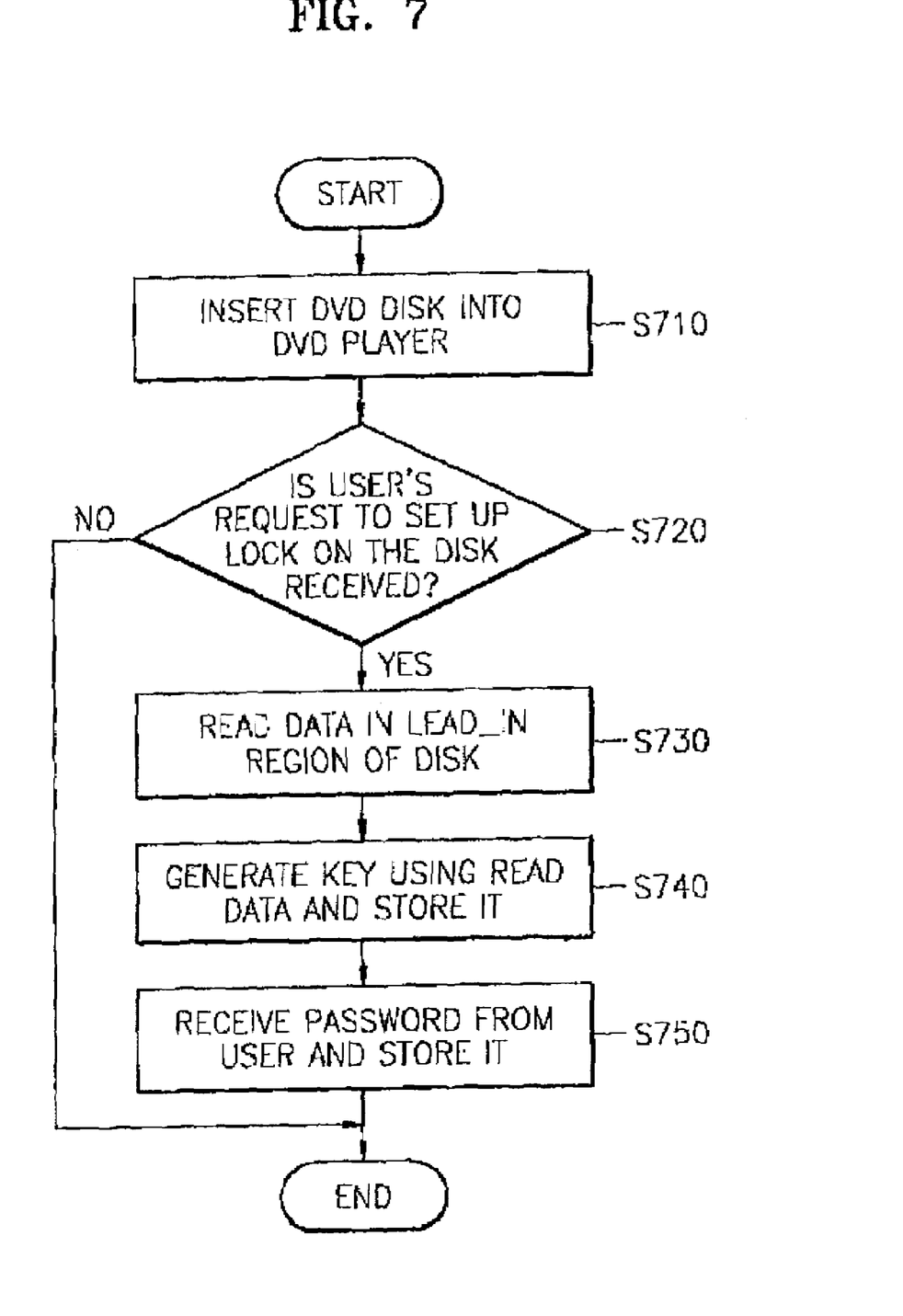
FIG. 7 is a flowchart to set up a key on the disk, according to an aspect of the present invention.

A method of setting up the key on the disk 260, according to an aspect of the present invention, will be described in the following with reference to FIG. 7.

At S710, after the DVD disk 260 is inserted into the DVD player, at S720, a determination is made as to whether or not a user's request to set up a lock on the disk 260 is received. If there is no such request from the user, the process is ended immediately. On the other hand, if there is a request at S730, data in the lead-in region 270 of the disk 260 is read. At S740, the key exclusively used for the disk 260 is generated using the data read from the lead-in region of the disk and is stored in a key storing unit. At S750, a password for the key is received from the user and is stored.

Figure 8:
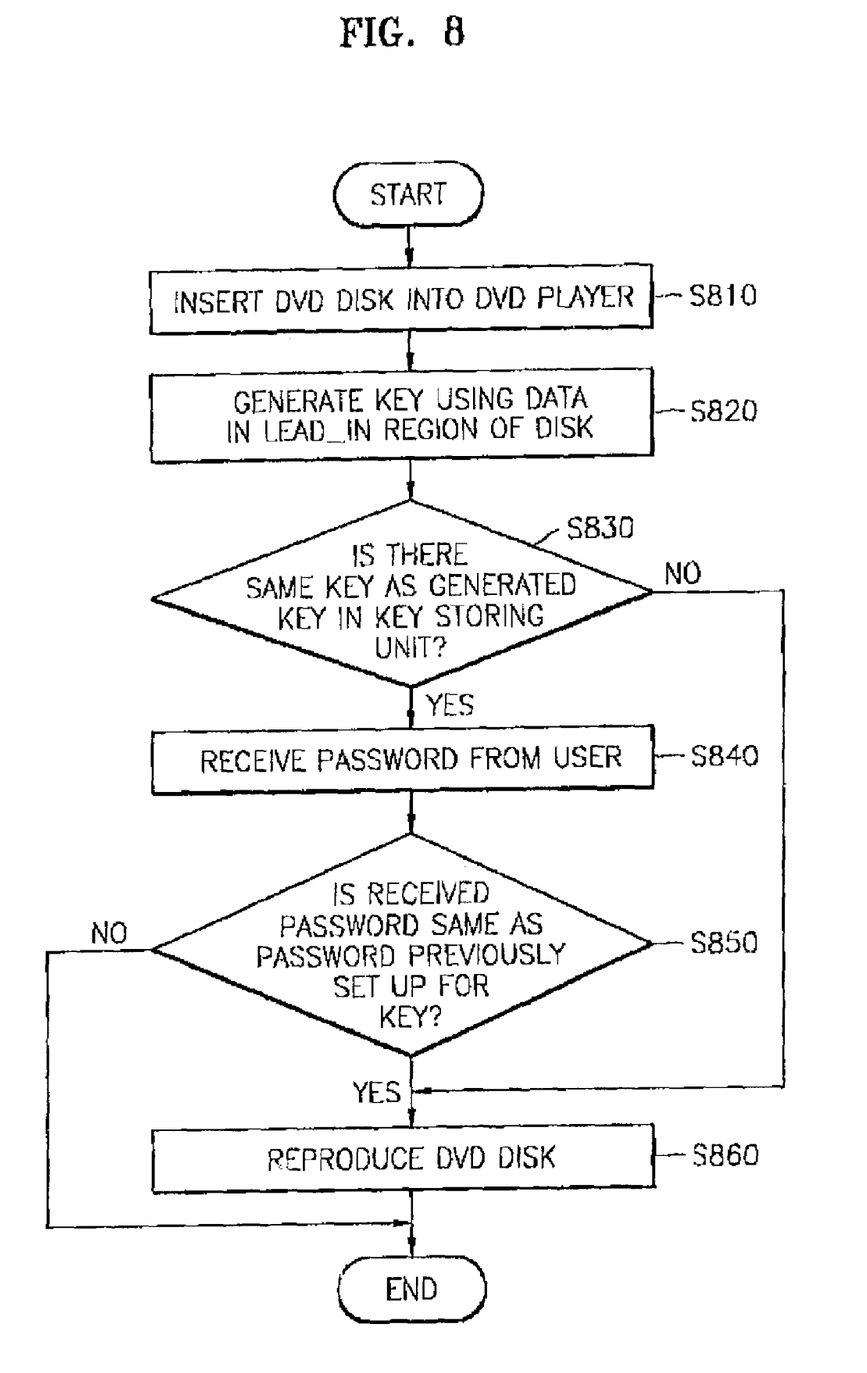
FIG. 8 is a flowchart to control the reproduction of the disk using the key set up on the disk, according to an aspect of the present invention.

A process of reproducing the disk using the key set up on the disk, according to an aspect of the present invention, will be described in the following with reference to FIG. 8.

At S810, when the DVD disk 260 desired to be reproduced is inserted into the DVD player, at S820, the key is generated using the data in the lead-in region 270 of the disk 260. At S830, the same key as the one that is generated for the disk 260 desired to be reproduced is searched for in the key storing unit 230.

If the same key as the one that is generated for the disk does not exist in the key storing unit 230, the process directly goes to S860 to reproduce the disk 260. If there exists the same key as the one that is generated for the disk in the key storing unit 230, at S840, the password for the key is input from the user.

Next, the newly-input password is compared with the password that is already stored in the key storing unit 230 corresponding to the key of S850. As a result of the comparison, if the two passwords are not the same, it is considered that the user does not know the password for the disk desired to be reproduced, and thus, the reproduction of the disk is not allowed. If the two passwords are the same, at S860, the disk is reproduced.

The present invention can be realized as computer-readable codes written on a computer-readable recording medium. Here, the computer-readable recording medium includes any kind of recording medium which can be read by a computer system. For example, the computer-readable recording medium includes a ROM, a RAM, a CD-ROM, a magnetic tape, a floppy disk, an optical data storage, a carrier wave (transmission through the Internet), and the like. The computer-readable recording medium can be decentralized to computer systems connected over network, and a computer can read the recording medium in a decentralized way.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A device to protect a reproduction of a disk, comprising:
    a key setting unit generating a key to encode lead-in region information of the disk and registering the key;
    a key storing unit storing the key generated by the key setting unit; and
    a reproduction determining unit determining whether to reproduce the disk using the key stored in the key storing unit.

2. The device of claim 1, wherein the key setting unit comprises:
    a key generating unit generating the key to encode the lead-in region information of the disk;
    a key registering unit registering the key for the disk; and
    a password registering unit registering a password input from a user for the key.

3. The device of claim 2, wherein the reproduction determining unit comprises:
    a temporary storing unit storing the key generated to encode the lead-in region information of the disk requested to be reproduced;
    a key searching unit searching a same key value in the key storing unit as the key that is stored in the temporary storing unit; and
    a password comparing unit comparing the password input from the user with the password for the key stored in the key storing unit, allowing the reproduction of the disk when the key in the key storing unit is the same key value as the key stored in the temporary storing unit, and preventing the reproduction of the disk otherwise.

4. The device of claim 1, wherein the key setting unit receives a user input password, and registers the user input password to correspond to the generated key.

5. The device of claim 4, wherein the reproduction determining unit stores the key generated to encode the lead-in region information of the disk requested to be reproduced, compares a new password input from a user with the user input password for the key stored in the key storing unit, and allows the reproduction of the disk when the key in the key storing unit is a same key value as the key stored in the reproduction determining unit.

6. The device of claim 1, wherein the key generated when encoding the lead-in region information varies depending on the disk.

7. The device of claim 4, wherein the key setting unit comprises:
    a key generating unit receiving the information of the lead-in region obtained by the reading unit, extracting and encoding at least one piece of information out of the information in the lead-in region to generate the key, and a password registering unit receiving the user input password and storing the user input password to correspond to the key registered in the key storing unit.

8. The device of claim 1, wherein the lead-in region of the disk comprises a reference code sector representing a periodicity of pit patterns of modulated signals on tracks and a control data sector.

9. The device of claim 1, wherein the control data sector comprises a disk size, a number of track layers on a readable side, disk type information, disk manufacturer information, copyright information, copy prevention information, and a start sector address/end sector address.

10. A method of protecting reproduction of a disk, comprising:

registering a key and a key value of the disk by encoding lead-in region information of the disk; and determining reproduction of the disk requested to be reproduced using the registered key.

11. The method of claim 10, further comprising:

setting up another key of the disk, wherein the setting up of the key comprises:

generating the other key encoding the lead-in region information of the disk, registering the other key generated for the disk and a corresponding key value, and registering a password from a user to correspond to the other registered key.

12. The method of claim 11, wherein the determining reproduction of the disk comprises:

determining whether the key value of the disk to be reproduced is equal to the key value of the other registered key; and receiving another password from the user when the key value of the disk to be reproduced is equal to the key value of the other registered key, allowing reproduction of the disk when the password of the key of the disk to be reproduced is the same as the other password from the user, and preventing the reproduction of the disk when the password for the key of the disk to be reproduced is not the same as the other password from the user.

13. A method of setting up a key on a disk, comprising:

receiving a request from a user to set up a lock on the disk;
reading data in a lead-in region of the disk;
generating a key for the disk using the data read from the lead-in region of the disk;
storing the key; and
receiving and storing a password for the stored key.

14. A method of reproducing a disk, comprising:
generating a key using data in a lead-in region of the disk to be reproduced;
storing the key and a corresponding key value;
searching for a reference key value; and
reproducing the disk when the reference key value is equal to the key value generated for the disk.

15. A computer-readable recording medium on which programs are recorded to provide a method of protecting reproduction of a disk, the method comprising:

setting up a key for the disk desired to be recorded;
encoding lead-in region information of the disk; and
determining whether to reproduce the disk using the key.

16. A computer-readable recording medium on which programs are recorded to provide a method of protecting reproduction of a disk, the method comprising:

receiving a request from a user to set up a lock on the disk;
reading data in a lead-in region of the disk;
generating a key for the disk using the data read from the lead-in region of the disk;
storing the key; and
receiving and storing a password for the stored key.

17. A computer-readable recording medium on which programs are recorded to provide a method of protecting reproduction of a disk, the method comprising:

generating a key using data in a lead-in region of the disk to be reproduced;
storing the key and a corresponding key value;
searching for a reference key value; and
reproducing the disk when the reference key value is equal to the key value generated for the disk.

18. A device to protect a reproduction of a disk, comprising:

a key setting unit generating a key to encode lead-in region information of the disk and registering the key;
a key storing unit storing the key generated by the key setting unit; and
a reproduction determining unit registering a password input from a user for the key.

19. A device to protect a reproduction of a disk, the device having a key setting unit to generate a key to encode lead-in region information of the disk and to register the key, a key storing unit to store the key generated by the key setting unit, and a reproduction determining unit storing a password input from a user for the key, the device comprising:

a password comparing unit receiving another password from the user, allowing reproduction of the disk when the password of the key of the disk to be reproduced is the same as the other password from the user, and preventing the reproduction of the disk when the password for the key of the disk to be reproduced is not the same as the other password from the user.

* * * * *